US007644345B2

(12) United States Patent
Lin et al.

(10) Patent No.: US 7,644,345 B2
(45) Date of Patent: Jan. 5, 2010

(54) BIT DISTRIBUTOR FOR MULTICARRIER COMMUNICATION SYSTEMS EMPLOYING ADAPTIVE BIT LOADING FOR MULTIPLE SPATIAL STREAMS AND METHODS

(75) Inventors: Xintian E Lin, Palo Alto, CA (US); Qinghua Li, Sunnyvale, CA (US); Alexei V Davydov, Nizhny Novgorod (RU); Alexander Alexandrovich Maltsev, Nizhny Novgorod (RU); Sumeet Sandhu, San Jose, CA (US); Ada Shuk Yan Poon, Emeryville, CA (US)

(73) Assignee: Intel Corporation, Santa Clara, CA (US)

( * ) Notice: Subject to any disclaimer, the term of this patent is extended or adjusted under 35 U.S.C. 154(b) by 703 days.

(21) Appl. No.: 11/034,204

(22) Filed: Jan. 12, 2005

(65) Prior Publication Data

US 2006/0156087 A1 Jul. 13, 2006

(51) Int. Cl.
*G06M 13/03* (2006.01)
(52) U.S. Cl. .................. 714/786; 714/752; 375/260
(58) Field of Classification Search ................ 714/752, 714/786; 375/260
See application file for complete search history.

(56) References Cited

U.S. PATENT DOCUMENTS

| 6,345,377 | B1 | 2/2002 | Kroeger et al. | |
|---|---|---|---|---|
| 6,690,736 | B1 * | 2/2004 | Andre | 375/260 |
| 7,145,956 | B2 * | 12/2006 | Koifman | 375/260 |
| 7,529,307 | B2 | 5/2009 | Sandhu et al. | |
| 2001/0031016 | A1 * | 10/2001 | Seagraves | 375/264 |
| 2003/0063685 | A1 | 4/2003 | Yoshida | |
| 2004/0017860 | A1 | 1/2004 | Liu | |
| 2004/0202257 | A1 | 10/2004 | Mehta et al. | |
| 2005/0157639 | A1 | 7/2005 | Song et al. | |
| 2005/0159115 | A1 | 7/2005 | Sandhu | |
| 2006/0013181 | A1 * | 1/2006 | Stolpman et al. | 370/342 |
| 2006/0034390 | A1 * | 2/2006 | Vummintala et al. | 375/299 |
| 2006/0067411 | A1 | 3/2006 | Sandhu | |
| 2006/0088115 | A1 * | 4/2006 | Chen et al. | 375/260 |
| 2006/0203779 | A1 | 9/2006 | Attar et al. | |
| 2006/0274687 | A1 | 12/2006 | Kim | |
| 2007/0025317 | A1 * | 2/2007 | Bolinth et al. | 370/347 |
| 2007/0211810 | A1 * | 9/2007 | Bohnke et al. | 375/260 |

FOREIGN PATENT DOCUMENTS

WO WO-2006076193 A1 7/2006

OTHER PUBLICATIONS

Hou, C., et al., "A Novel Method with Adaptive Multi-Service Transmission Algorithms Based on OFDM", *Proceedings of the 2002 IEEE Canadian Conference on Electrical & Computer Engineering*, 1, (May 12, 2002),1305-1310.

(Continued)

*Primary Examiner*—Guy J Lamarre
*Assistant Examiner*—Sam Rizk
(74) *Attorney, Agent, or Firm*—Schwegman, Lundberg & Woessner, P.A.; Gregory J. Gorrie

(57) ABSTRACT

In a multicarrier transmitter that transmits two or more spatial data streams, a bit distributor assigns encoded bits to the spatial data streams based on bit-loading capabilities of the streams and in a manner to intermix the bits among the spatial streams.

13 Claims, 4 Drawing Sheets

OTHER PUBLICATIONS

Wong, C. Y., et al., "Multiuser Subcarrier Allocation for OFDM Transmission using Adaptive Modulation", *Vehicular Technology Conference*, 1, *IEEE*, XP010342007, ISBN: 0-7803-5565-2,(May 16, 1999),479-483.

"U.S. Appl. No. 11/093,743 Response filed Sep. 8, 2008 to Non-Final Office Action mailed Jun. 24, 2008", 8 pgs.

"U.S. Appl. No. 11/093,743 Non-Final Office Action mailed Jun. 24, 2008.", 11 pgs.

"U.S. Appl. No. 11/093,743, Notice of Allowance mailed Dec. 22, 2008", 11 pgs.

0714636.8, "United Kingdom Application No. 0714636.8 Office Action Mailed Dec. 24, 2008", 11 pgs.

Chemaly, et al., "Adaptive resource allocation for multiuser MIMO/OFDM networks based on partial channel states information", IEEE Globecom 2005, 3922-3926.

Funk, J C, et al., "Inverse multiplexing in short range multi transport wireless communication", IEEE Wireless communication and Networking Conferencing, (Mar. 2003), 757-762.

Song, P, et al., "Multi user subcarrier allocation with minimum rate", IEEE Vehicular Technology Conference 2004, 1920-1924.

* cited by examiner

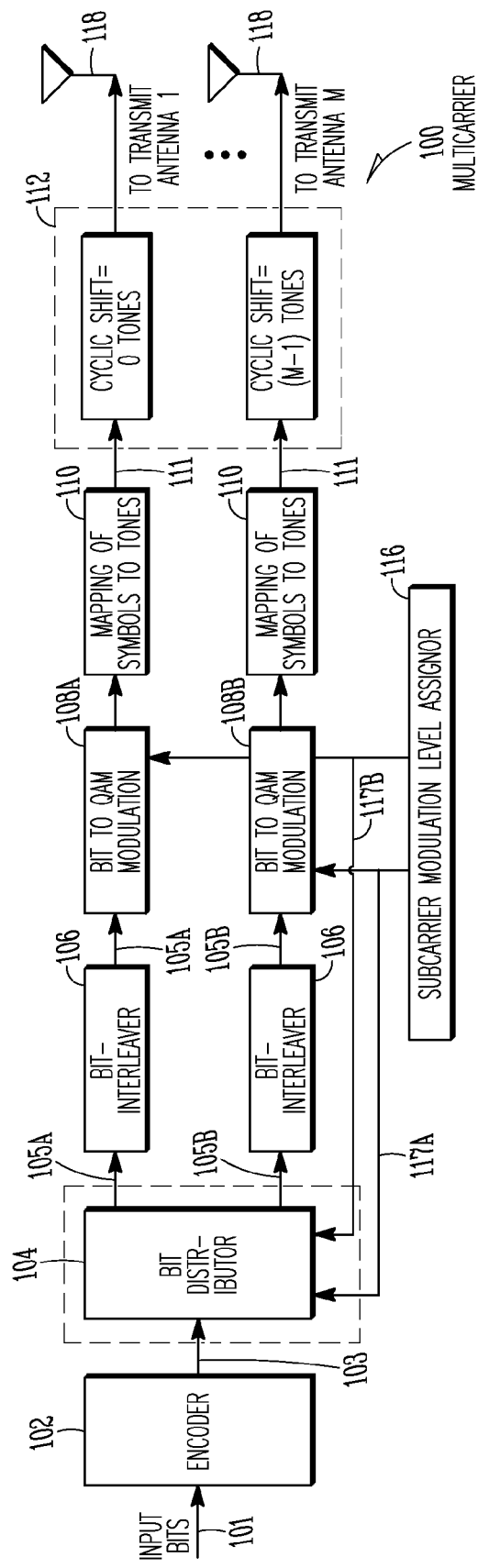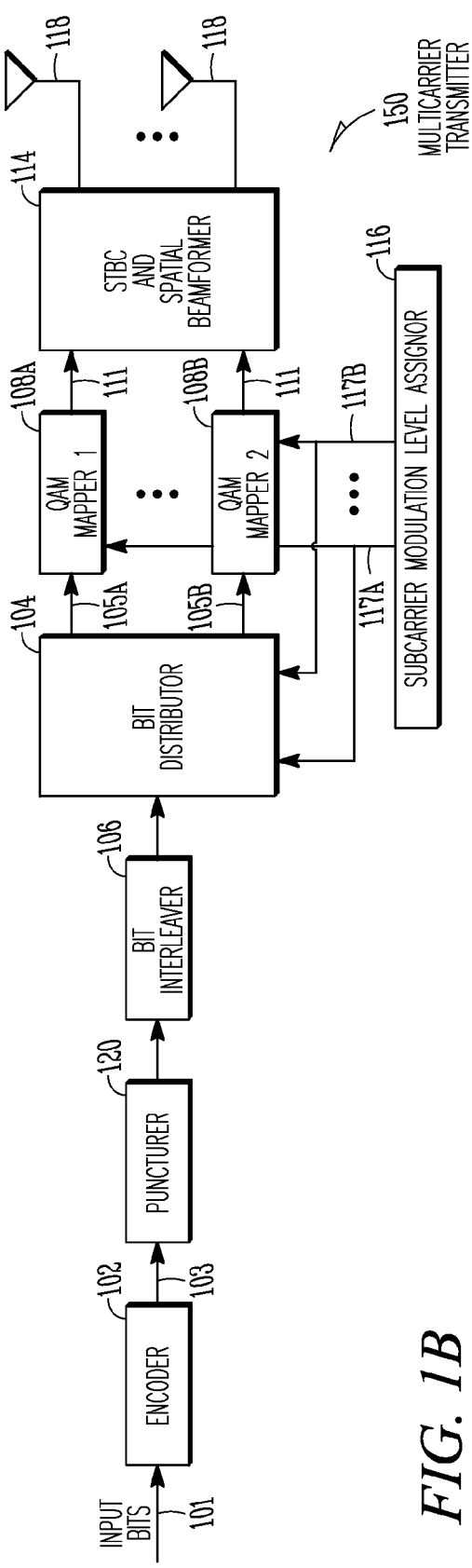
FIG. 1A
FIG. 1B

BIT DISTRIBUTOR FOR MULTICARRIER COMMUNICATION SYSTEMS EMPLOYING ADAPTIVE BIT LOADING FOR MULTIPLE SPATIAL STREAMS AND METHODS

TECHNICAL FIELD

Embodiments of the present invention pertain to wireless communications. Some embodiments pertain to multicarrier communication systems.

BACKGROUND

Multicarrier communication systems use symbol-modulated subcarriers to communicate. Changing channel conditions, including frequency selective fading, may result in different data carrying capabilities of the subcarriers.

BRIEF DESCRIPTION OF THE DRAWINGS

FIGS. 1A and 1B are block diagrams of multicarrier transmitters in accordance with some embodiments of the present invention;

DETAILED DESCRIPTION

Figure 2:
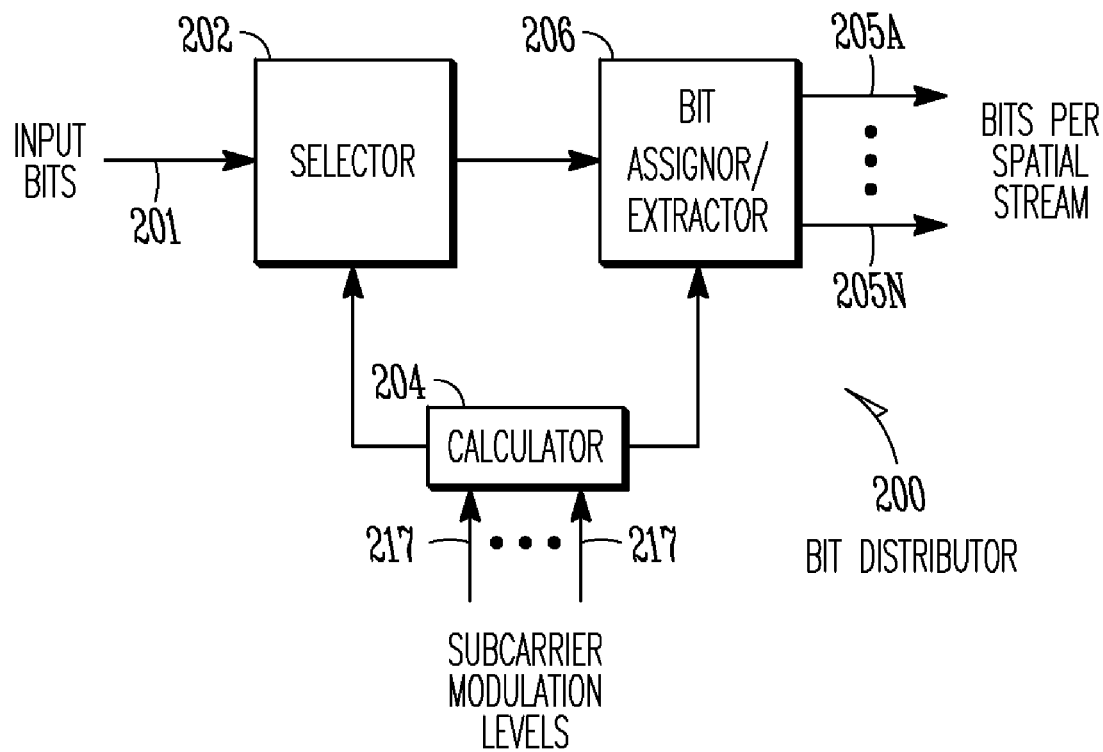
FIG. 2 is a functional diagram of a bit distributor in accordance with some embodiments of the present invention.

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

FIGS. 1A and 1B are block diagrams of multicarrier transmitters in accordance with some embodiments of the present invention. Multicarrier transmitter 100 (FIG. 1A) and multicarrier transmitter 150 (FIG. 1B) may transmit two or more data streams using two or more antennas 118. The two or more data streams may be generated from one input bit stream 101. In some embodiments, multicarrier transmitters 100 and 150 may be part of a multiple input multiple output (MIMO) multicarrier communication system in which a receiving station may be configured to receive and separate the two or more data streams transmitted by the transmitter. Although transmitters 100 and 150 may transmit more than two data streams, circuitry is illustrated for two data streams. Elements illustrated in FIGS. 1A and 1B having the same reference designation may perform similar functions.

Multicarrier transmitters 100 and 150 may comprise encoder 102 to encode input bit stream 101 and to generate encoded bit stream 103. In some embodiments, encoder 102 may be a forward-error-correcting (FEC) encoder, although the scope of the invention is not limited in this respect.

In accordance with some embodiments of the present invention, multicarrier transmitters 100 and 150 include bit distributor 104 to generate at least first and second spatial bit streams 105A and 105B from an input bit stream. The bit distributions for streams 105A and 105B may be based on, among other things, subcarrier modulation assignments 117A and 117B of the first and second streams. The bit distributions for streams 105A and 105B may also be determined by bit distributor 104 to increase diversity among sequential bits of the input bit stream. The subcarrier modulation assignments may relate to the bit-loading capabilities of the subcarriers of the multicarrier communication signal and may be determined as part of an adaptive bit-loading (ABL) process. These embodiments are discussed in more detail below.

Multicarrier transmitters 100 and 150 may also comprise bit interleavers 106 to perform an interleaving operation on their input bit stream. In some embodiments, the interleaving operation may be performed after the operations of bit distributor 104, while in other embodiments (e.g., multicarrier transmitter 150), the interleaving operation may be performed before bit distributor 104. Interleavers 106 may change the order of the input bits, and in some embodiments, may comprise block interleavers in which a block of input bits are input to a matrix in a row by-row fashion and output from the matrix in a column-by-column fashion, although the scope of the invention is not limited in this respect.

Multicarrier transmitters 100 and 150 may also include first stream mapping circuitry 108A to map bits of first stream 105A to symbols in accordance with subcarrier modulation assignments 117A for the first stream, and second stream mapping circuitry 108B to map bits of second stream 105B to symbols in accordance with subcarrier modulation assignments 117B for the second stream. Subcarrier modulation assignments 117A and 117B may be provided by subcarrier modulation level assignor 116 based on channel conditions. The channel conditions may be determined by a multicarrier receiver as part of a closed-loop system, although the scope of the invention is not limited in this respect. In some embodiments, subcarrier modulation assignments 117A and 117B may be individual subcarrier modulation assignments in which individual subcarriers or groups of subcarriers are assigned modulation levels based on channel conditions. In other embodiments, all subcarriers of each data stream 105A and 105B may be assigned a modulation level, although the scope of the invention is not limited in this respect.

In some of these embodiments, transmitters 100 and 150 may symbol-modulate the subcarriers in accordance with the subcarrier modulation assignments. This may be referred to as adaptive bit loading (ABL). Accordingly, one or more bits may be represented by a symbol modulated on a subcarrier. The modulation assignments for the individual subchannel may be based on the channel characteristics or channel conditions for that subcarrier, although the scope of the invention is not limited in this respect. In some embodiments, the subcarrier modulation assignments may range from zero bits per symbol to up to ten or more bits per symbol. In terms of modulation levels, the subcarrier modulation assignments may comprise binary phase shift keying (BPSK), which communicates one bit per symbol, quadrature phase shift keying (QPSK), which communicates two bits per symbol, 8PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Modulation levels with higher data communication rates per subcarrier may also be used.

In multicarrier transmitter 100, mapping circuitry 108A and 108B may symbol-modulate bits based on a modulation level (e.g., a quadrature amplitude modulation (QAM) level) for each subcarrier based the subcarrier modulation assignment for that subcarrier. Mapping circuitry 108A and 108B may generate symbols for each subcarrier, and circuitry 110 may symbol-modulate the individual subcarriers to generate symbol-modulated subcarriers 111. In multicarrier transmitter 150, circuitry 108A and 108B may map a number of bits to symbols based on subcarrier modulation assignments 117A and 117B, and may generate symbol-modulated subcarriers 111. In some embodiments, the number of data subcarriers of a multicarrier communication signal may range from 48 up to 256 or more, although the scope of the invention is not limited in this respect.

Symbol-modulated subcarriers 111 for each data stream may be converted to analog signals, may be RF modulated and may be transmitted by an associated one of antennas 118. In some embodiments, each antenna 118 may transmit one spatial data stream, while in other embodiments, beamforming may be applied (e.g., by spatial beamformer 114) to allow two or more antennas 118 to transmit one or more spatial streams. In some embodiments, beamforming may be done in the frequency domain on a per-subcarrier basis, although the scope of the invention is not limited in this respect. In some embodiments, a space-time block coder (STBC) may be used to introduce redundancy to help reduce the effects of channel fading, although the scope of the invention is not limited in this respect.

In some embodiments, cyclic shifters 112 may be used to introduce a cyclic shift to the subcarriers. In these embodiments, the mapped symbols may be circularly shifted among the tones (i.e., subcarriers).

In some embodiments, multicarrier transmitter 150 may include puncturer 120. Puncturer 120 may delete part of the coded bits provided by encoder 102 in order to increase the code rate, although the scope of the invention is not limited in this respect.

In some embodiments, bit distributor 104 may distribute bits among the plurality of streams. In these embodiments, bit distributor 104 may calculate a delta for a first stream (i.e., stream 105A) based on a bit-loading capability of the first stream. Bit distributor 104 may extract bits for the first stream from a group of selected input bits based on the delta for the first stream. After bits are extracted for the first stream, bit distributor 104 may also calculate a delta for a second stream (i.e., stream 105B) based on a bit-loading capability of the second stream, and may extract bits for the second stream from the remaining bits of the initial group based on the delta for the second stream. In these embodiments, the delta for the first stream may be based on the sum of the bit-loading capabilities of all streams of the plurality divided by the bit-loading capability of the first stream. The delta for the second stream may be based on the sum of the bit-loading capabilities of remaining (i.e., unassigned) streams divided by the bit-loading capability of the second stream. These embodiments are described in more detail below.

In some embodiments, either of multicarrier transmitter 100 and/or 150 may be part of a wireless communication device that may transmit orthogonal frequency division multiplexed (OFDM) communication signals. In some embodiments, transmitters 100 and/or 150 may transmit over a multicarrier communication channel. The multicarrier communication channel may be within a predetermined frequency spectrum and may comprise a plurality of orthogonal subcarriers. In some embodiments, the orthogonal subcarriers of a subchannel may be closely spaced OFDM subcarriers. To help achieve orthogonality between the closely spaced subcarriers, each subcarrier may have a null at substantially a center frequency of the other subcarriers. In some embodiments, to help achieve orthogonality between the closely spaced subcarriers, each subcarrier may have an integer number of cycles within a symbol period, although the scope of the invention is not limited in this respect.

In some embodiments, the frequency spectrums for a multicarrier communication signal may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and WiMax embodiments, the frequency spectrum for communications may comprise frequencies between 2 and 11 GHz, although the scope of the invention is not limited in this respect.

In some embodiments, multicarrier transmitters 100 and/or 150 may transmit RF communications in accordance with specific communication standards, such as the Institute of Electrical and Electronics Engineers (IEEE) standards including IEEE 802.11(a), 802.11(b), 802.11(g), 802.11(h) and/or 802.11 (n) standards for wireless local area networks (WLANs), although multicarrier transmitters 100 and/or 150 may also be suitable to transmit and/or receive communications in accordance with other techniques including the Digital Video Broadcasting Terrestrial (DVB-T) broadcasting standard, and the High performance radio Local Area Network (HiperLAN) standard. In some broadband and WiMax embodiments, multicarrier transmitters 100 and/or 150 may transmit broadband wireless communications in accordance with the IEEE 802.16(e) standards for wireless metropolitan area networks (WMANs).

In some embodiments, multicarrier transmitters 100 and/or 150 may be part of a portable wireless communication device, such as personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. In some broadband and WiMax embodiments, multicarrier transmitters 100 and/or 150 may be part of a transmitting station.

Antennas 118 may comprise one or more directional or omnidirectional antennas, including, for example, dipole antennas, monopole antennas, patch antennas, loop antennas, microstrip antennas or other types of antennas suitable for transmission of RF signals.

FIG. 2 is a functional diagram of a bit distributor in accordance with some embodiments of the present invention. Bit distributor 200 may be suitable for use as one of bit distributors 104 (FIGS. 1A and 1B), although other configurations of bit distributors may also be suitable. Bit distributor 200 receives input bit stream 201 and generates two or more output streams 205A through 205N. The number of output bit streams may correspond to the number of streams that are transmitted by the multicarrier transmitter and may range from as little as two to up to four or more.

In some embodiments, bit distributor 200 may distribute bits based on subcarrier modulation assignments 217 which may indicate the bit-loading capabilities of the different spatial streams. Bit distributor 200 may increase diversity among bits of input bit stream 201 by reducing the number of contiguous bits on the same output stream 205. Bit distributor may also spread the bits of input bit steam 201 among output streams 205.

In some embodiments, bit distributor 200 may comprise calculator 204 to calculate a delta for a first stream based on bit-loading capability of the first stream. Bit distributor 200 may also include bit extractor 206 to extract bits for the first stream from a group of selected input bits based on the delta for the first stream. Calculator 204 may calculate a delta for a second stream based on a bit-loading capability of the second stream, and bit extractor 206 may extract bits for the second stream from remaining bits of the group based on the delta for the second stream. This process may be repeated for each remaining output stream. In some embodiments, the delta for the first stream may be based on the sum of the bit-loading capabilities of all streams divided by the bit-loading capability of the first stream. The delta for the second stream may be based on the sum of the bit-loading capabilities of the remaining unassigned streams divided by the bit-loading capability of the second stream. Bit extractor 206 may provide groups of bits for each stream in accordance with a ratio of the bit-loading capabilities of the plurality of streams.

In some embodiments, calculator 204, for example, may sort the plurality of streams based on the bit-loading capabilities of the streams. In these embodiments, the first stream may be selected to have a greatest of the bit-loading capabilities and the second stream may be selected to have a next-greatest of the bit-loading capabilities.

For example, when three output streams are provided, the first stream may be operating at a modulation level of 64-QAM (i.e., six coded bits per symbol), the second stream may be operating at a modulation level of 16-QAM (i.e., four coded bits per symbol), and the third stream may be operating at a modulation level of QPSK (i.e., two coded bits per symbol). In this example, bit distributor 200 may provide output bits to the first, second and third streams in ratios of 6:4:2. In some embodiments, bit distributor 200 may also include bit selector 202 to select a group of input bits based on the bit-loading capabilities of the plurality of spatial streams.

In some embodiments, the bit-loading capabilities may represent a number of bits per symbol for symbol modulating data subcarriers (i.e., tone) of each of the streams prior to transmission. In some embodiments, the bit-loading capabilities may be determined from channel conditions for each subcarrier frequency and/or each spatial channel. The bit-loading capabilities may be dynamically revised, updated and/or changed in response to changing channel conditions.

Although transmitter 100 (FIG. 1A), transmitter 150 (FIG. 1B) and bit distributor 200 are illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein. In some embodiments, the functional elements of transmitter 100 (FIG. 1A), transmitter 150 (FIG. 1B) and bit distributor 200 may refer to one or more processes operating on one or more processing elements, although the scope of the invention is not limited in this respect.

Figure 3:
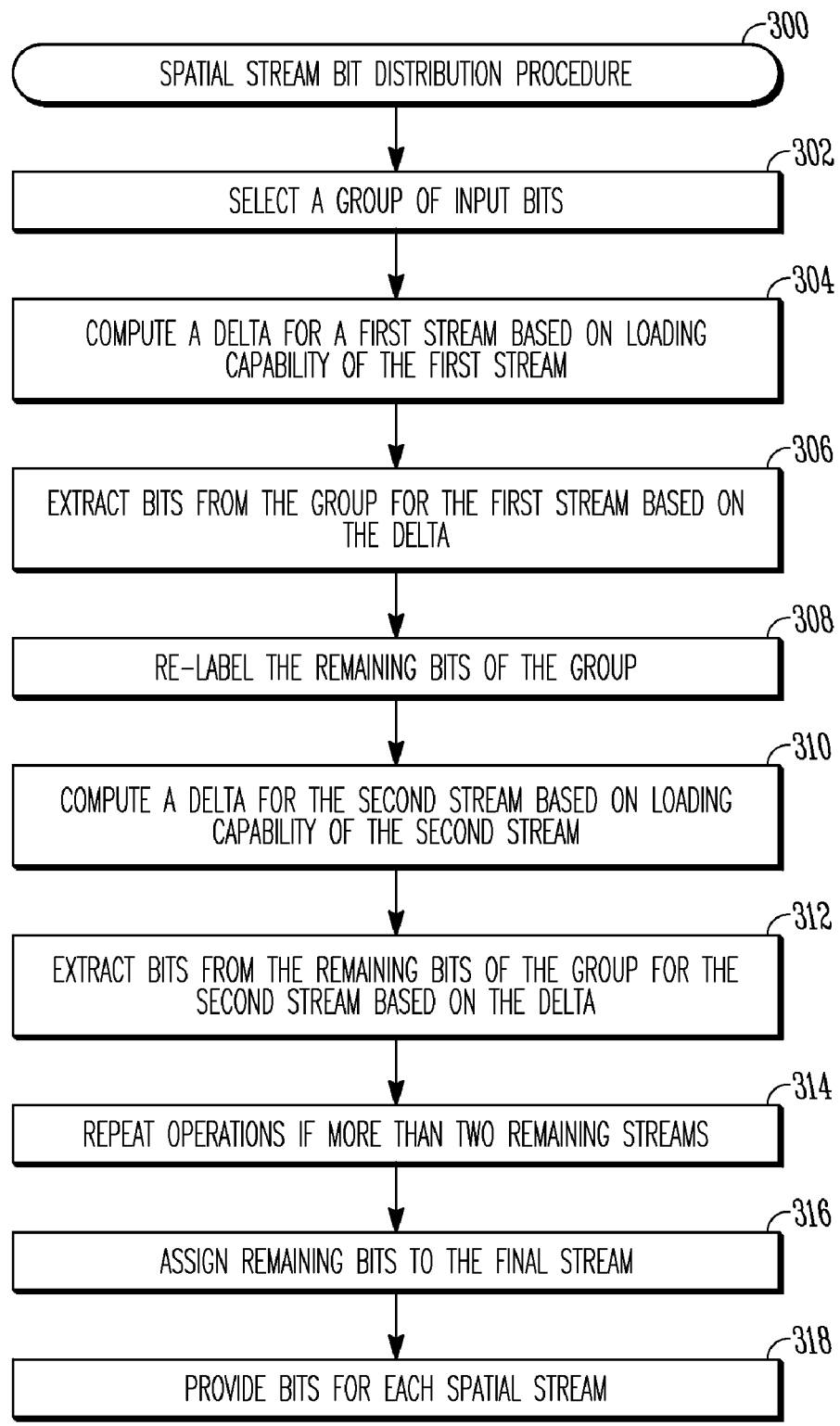
FIG. 3 is a flow chart of a spatial stream bit distribution procedure in accordance with some embodiments of the present invention.

FIG. 3 is a flow chart of a spatial stream bit distribution procedure in accordance with some embodiments of the present invention. Spatial stream bit distribution procedure 300 may be performed by a bit distributor, such as bit distributors 104 (FIGS. 1A and 1B) or bit distributor 200 (FIG. 2), although other configurations of bit distributors may be used to perform procedure 300. In procedure 300, a delta (i.e., a step size) is calculated for each output stream. The delta may be a nominal spacing between two bits for the output stream currently being distributed over the remaining input bit sequence. The bit distribution process may be performed on a stream by stream basis. In each iteration (i.e., a distribution for one stream), bits may be attempted to be evenly extracted for the current stream from the input bits remaining after the previous iteration. The variable delta may depict the spacing between two extracted bits in the remaining bits after the previous iteration. Examples of these embodiments are described in more detail below.

In operation 302, an initial group of input bits is selected. The number of bits in the group may be based on the bit-loading capabilities of the streams. As part of operation 302, the output streams may be sorted based on their bit-loading capability so that the stream with the greatest bit-loading capability is generated on first and the stream with the lowest bit-loading capability is generated last. In an example with three streams, the first stream may be operating at a modulation level of 64-QAM (i.e., six coded bits per symbol), the second stream may be operating at a modulation level of QPSK (i.e., two coded bits per symbol), and the third stream may be operating at a modulation level of QPSK (i.e., two coded bits per symbol).

In operation 304, for the first stream (with loading capability six bits per symbol), a delta is computed by summing the bit-loading capabilities of the remaining streams and dividing by the bit-loading capability of the current stream. In this example, the delta may be computed as follows: Delta= (6+2+2)/6=5/3.

Operation 306 extracts bits from the input group for the first stream based on the delta. In this example, for determining the first bit of output stream one, j=1, and k=round (1*5/3)=2. Therefore, the second bit in the input bit sequence is assigned to the first stream. For the second bit of the first stream, j=2, k=round (2*5/3)=3. Therefore the third bit in the input bit sequence is assigned to the first stream. This process is repeated until k exceeds the number of selected input bits. The distribution is now complete for the first stream.

Operation 308 comprises re-labeling the remaining bits. In the above example, remaining bits 1, 4, 6, 9, 11, 14, 16, may be relabeled as bits 1, 2, 3, 4, 5, 6, 7 in the case when sixteen input bits were selected in operation 302. Operations 310 and 312 may repeat this process for the next (i.e., second) stream using the relabeled bits.

Operation 310 computes a delta for the second stream based on the bit-loading capability of the second stream. In this example, the bit-loading capability of the second stream is two bits per subcarrier, and the delta may equal (2+2)/2=2.

Operation 312 may extract bits for the second stream from the remaining bits. In this example, for the first bit of the second stream, j=1 and k=round (1*2)=2. Therefore, the second bit in the remaining bit sequence is assigned to the second stream. The second bit was the fourth bit in the original bit sequence. This process is repeated until k is greater than the number of remaining bits. For j=4, k=round (4*2)=8, since 8>7 (i.e., the number of remaining bits), the distribution is completed for the second stream.

Operation 314 repeats operations 308 through 312 for each remaining stream, and when only one stream remains, the remaining bits may be assigned to the remaining stream in operation 316. In the example with three streams, operation 316 may assign the remaining (i.e., unassigned) bits to the third stream.

Operation 318 may provide the distributed bits for each spatial stream as output streams as outputs of a bit distributor.

In some embodiments, the maximum number of contiguous bits from the input stream may be determined by ceil (N/N1), where N is the sum of loading capabilities of all streams and N1 is the loading capability of the first stream respectively. Function ceil(x) may take the least integer greater than or equal to x.

In the example discussed above, the modulation levels of all data subcarriers of the first stream are 64 QAM, while the modulation levels of all data subcarriers of the second and third streams are QPSK; however the scope of the invention is not limited in this respect. In other embodiments, the modulation levels of the individual subcarriers of the same stream may be different.

Although the individual operations of procedure 300 are illustrated and described as separate operations, one or more of the individual operations may be performed concurrently, and nothing requires that the operations be performed in the order illustrated.

Figure 4A:
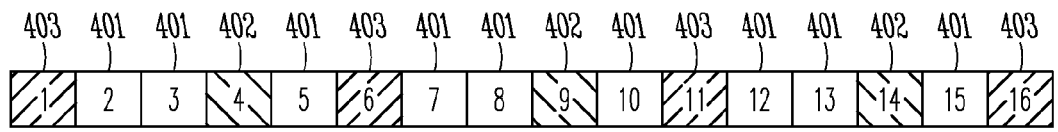
FIGS. 4A and 4B are examples of bit distributions for three streams in accordance with some embodiments of the present invention.
Figure 4B:
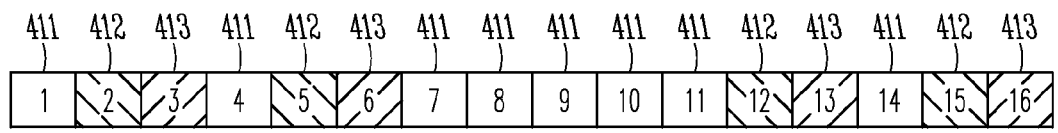

FIGS. 4A and 4B are examples of bit distributions for three streams in accordance with some embodiments of the present invention. In the example of FIG. 4A, each stream (or spatial channel) i sends $\tilde{n}_i$ bits per subcarrier for i=1, ..., $N_s$, where $N_s$ is the number of streams and $\tilde{n}_1 \geq \tilde{n}_2 ... \geq \tilde{n}_{N_s}$. Let m denote the greatest common factor of $\tilde{n}_i$ for i=1, ... $N_s$ and denote $$n_i = \frac{\tilde{n}_i}{m}.$$

In this example, bit distributor 104 (FIGS. 1A and 1B) may distribute coded bits group by group, where each group has $$N_b = \sum_{i=1}^{N_s} n_i$$

contiguous coded bits. For some embodiments, $\tilde{n}_i$ takes a value of from 6, 4, and 2 (i.e., the possible numbers of bits per symbol for this example); $n_i$ takes value from 3, 2, and 1; and m equals to 2. Example pseudo code that may be implemented by bit distributor 104 (FIGS. 1A and 1B) is listed as follows:

1) Select $N_b$ contiguous input bits.
2) Let $N=N_b$.
3) For i=1:N,
4) Let $$\Delta = \frac{N}{n_i},$$

where N is the number of remaining bits after bits have been assigned to the first i−1 streams.
5) For j=1, ..., $n_i$
6) Distribute the k-th bit of the N remaining bits to the i-th stream, where k=round(jΔ).
7) End
8) Label the remaining bits sequentially from 1 to N−$n_i$.
9) Update N=N−$n_i$.
10) End The function round ( ) may be substituted by other functions such as floor ( ) and ceil ( ). In an example of ten input bits labeled sequentially b1 through b10, a bit distributor may provide the following output sequences for the first ten bits:

Stream 1: b2, b3, b5, b7, b8, b10;
Stream 2: b4, b9;
Stream 3: b1, b6.

As can be seen, the streams intermix sequential bits very well as illustrated in FIG. 4A. In FIG. 4A, the first stream is illustrated by bits labeled 401, the second stream is illustrated by bits labeled 402, and the third stream is illustrated by bits labeled 403. In this example, the maximum number of contiguous bits of the same stream is two bits.

In another embodiment, illustrated in FIG. 4B, bit distributor 104 (FIGS. 1A and 1B) may assign $N_b$ bits to $N_s$ streams alternately until the last stream (i.e. stream $N_s$) has enough bits (i.e. $n_{N_s}$ bits). The bit distributor may continue to assign the remaining bits to the first $N_s$−1 streams alternately until stream $N_s$−1 has enough bits (i.e. $n_{N_s-1}$ bits). This process may be repeated until the second stream has $n_2$ bits. Finally, the remaining $N_b$ bits may be assigned to the first stream. Example pseudo code that may be implemented by bit distributor 104 (FIGS. 1A and 1B) for this example embodiment is listed as follows:

1) Select $N_b$ contiguous input bits.
2) Let $n_{N_s+1}=0$.
3) For i=$N_s$:−1:1
4) For j=$n_{i+1}$+1:$n_i$
5) Distribute the remaining bits to the first i streams alternately.
6) End
7) End Based on the previous example embodiment, the bit distributor may provide the following output for the first ten bits.

Stream 1: b1, b4, b7, b8, b9, b10;
Stream 2: b2, b5;
Stream 3: b3, b6.

In this example, the latter portion of the first stream doesn't intermix very well with the second and third streams. Namely, b7, b8, b9, b10, and b11 in the first stream do not intermix with the second and third streams. This is illustrated in FIG. 4B. In FIG. 4B, the first stream is illustrated by bits labeled 411, the second stream is illustrated by bits labeled 412, and the third stream is illustrated by bits labeled 413. In this example, the maximum number of contiguous bits of the same stream is five.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof.

Embodiments of the invention may be implemented in one or a combination of hardware, firmware and software.

Embodiments of the invention may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A bit distributor for use in a transmitter for concurrent transmission of a plurality of streams through two or more spatial channels, comprising:
   a calculator to calculate a first delta for a first of the streams and a second delta for a second of the streams; and
   a bit extractor to extract a first set of bits for the first stream in a non-sequential manner from an input group of selected input bits,
   wherein the bit extractor determines which bits to extract from the input group for the first stream by multiplying a bit index of each bit of the first set by the first delta to determine a bit index of the bit to extract from the input group,
   wherein after extraction of the set of bits for the first stream, the bit extractor is configured to sequentially re-label remaining bits of the input group and to extract a second set of bits for the second stream in a non-sequential manner from the relabeled remaining bits,
   wherein the bit extractor determines which bits to extract from the relabeled remaining bits for the second stream by multiplying a bit index of each bit of the second set by the second delta to determine a bit index of the bit to extract from the relabeled remaining bits,
   wherein the first delta is calculated based on the sum of the bit-loading capabilities of the plurality of streams divided by the bit-loading capability of the first stream, and
   wherein the second delta is calculated based on the sum of the bit-loading capabilities of the second and any remaining streams of the plurality divided by the bit-loading capability of the second stream.

2. The bit distributor of claim 1 wherein when the plurality of streams comprises at least a third stream:
   the calculator is configured to calculate a third delta is based on the sum of the bit-loading capabilities of the third and any remaining streams of the plurality divided by the bit-loading capability of the third stream; and
   the bit extractor is configured to:
   sequentially re-label remaining bits of the input group after extraction of the set of bits for the second stream; and
   extract a third set of bits for the third stream in a non-sequential manner from the relabeled remaining bits,
   wherein the bit extractor determines which bits to extract from the relabeled remaining bits for the third stream by multiplying a bit index of each bit of the third set by the third delta to determine a bit index of the bit to extract from the relabeled remaining bits.

3. The bit distributor of claim 2 wherein each spatial channel utilizes a same set of OFDM subcarriers,
   wherein the bit-loading capabilities represent a number of bits per symbol for symbol modulating data subcarriers of each of the streams prior to transmission, and
   wherein the bit-loading capabilities are determined from channel conditions for the subcarriers of the spatial channels.

4. The bit distributor of claim 2 wherein the calculator is configured to sort the plurality of streams based on the bit-loading capabilities of the streams,
   wherein the first stream has a greatest of the bit-loading capabilities and the second stream has next-greatest of the bit-loading capabilities, and
   wherein the bit distributor further comprises a bit selector to select a number of bits for the input group based on the bit-loading capabilities of the plurality of spatial streams.

5. The bit distributor of claim 2 wherein the bit distributor is part of a multicarrier transmitter that includes an interleaver for each stream to perform separate interleaving operations on the bits of the streams that are generated by the bit interleaver.

6. A method of distributing bits among a plurality of streams for concurrent transmission through two or more spatial channels sharing a same frequency spectrum, the method comprising:
   calculating a first delta for a first of the streams and a second delta for a second of the streams;
   extracting a first set of bits in a non-sequential manner for the first stream from an input group of selected input bits, the extracting comprising determining which bits to extract from the input group for the first stream by multiplying a bit index of each bit of the first set by the first delta to determine a bit index of the bit to extract from the input group;
   sequentially re-labeling remaining bits of the input group after the extraction of the first set;
   extracting a second set of bits for the second stream in a non-sequential manner from the relabeled remaining bits, wherein extracting comprises determining which bits to extract from the relabeled remaining bits for the second stream by multiplying a bit index of each bit of the second set by the second delta to determine a bit index of the bit to extract from the relabeled remaining bits,
   wherein the first delta is calculated based on the sum of the bit-loading capabilities of the plurality of streams divided by the bit-loading capability of the first stream, and
   wherein the second delta is calculated based on the sum of the bit-loading capabilities of the second and any remaining streams of the plurality divided by the bit-loading capability of the second stream.

7. The method of claim 6 wherein when the plurality of streams comprises a third stream, the method further comprises:

calculating a third delta is based on the sum of the bit-loading capabilities of the third and any remaining streams of the plurality divided by the bit-loading capability of the third stream;

sequentially re-labeling remaining bits of the input group after extraction of the set of bits for the second stream; and extracting a third set of bits for the third stream in a non-sequential manner from the relabeled remaining bits, wherein the extracting comprises determining which bits to extract from the relabeled remaining bits for the third stream by multiplying a bit index of each bit of the third set by the third delta to determine a bit index of the bit to extract from the relabeled remaining bits.

8. The method of claim 7 wherein each spatial channel utilizes a same set of OFDM subcarriers, wherein the bit-loading capabilities represent a number of bits per symbol for symbol modulating data subcarriers of each of the streams prior to transmission, wherein the bit-loading capabilities are determined from channel conditions for the subcarriers of the spatial channels, and wherein the method further comprises changing the bit-loading capabilities dynamically in response to changing channel conditions.

9. The method of claim 7 further comprising:

sorting the plurality of streams based on the bit-loading capabilities of the streams; and selecting a number of bits for the input group based on the bit-loading capabilities of the plurality of spatial streams, wherein the first stream has a greatest of the bit-loading capabilities and the second stream has next-greatest of the bit-loading capabilities.

10. The method of claim 7 further comprising providing output groups of bits for each stream in accordance with the ratio of the bit-loading capabilities of the plurality of streams.

11. A multicarrier transmitter configured to concurrently transmit a plurality of streams through two or more spatial channels, the multicarrier transmitter comprising:

first stream mapping circuitry to map bits of a first stream to symbols in accordance with subcarrier modulation assignments for the first stream;

second stream mapping circuitry to map bits of a second stream to symbols in accordance with subcarrier modulation assignments for the second stream; and a bit distributor to generate the first and second streams from an input bit stream, wherein the bit distributor comprises:

a calculator to calculate a first delta for the first stream and a second delta for the second stream; and a bit extractor to extract a first set of bits for the first stream in a non-sequential manner from an input group of selected input bits of the input bit stream, wherein the bit extractor determines which bits to extract from the input group for the first stream by multiplying a bit index of each bit of the first set by the first delta to determine a bit index of the bit to extract from the input group, wherein after extraction of the set of bits for the first stream, the bit extractor is configured to sequentially re-label remaining bits of the input group and to extract a second set of bits for the second stream in a non-sequential manner from the relabeled remaining bits, and wherein the bit extractor determines which bits to extract from the relabeled remaining bits for the second stream by multiplying a bit index of each bit of the second set by the second delta to determine a bit index of the bit to extract from the relabeled remaining bits, wherein the first delta is calculated based on the sum of the bit-loading capabilities of the plurality of streams divided by the bit-loading capability of the first stream, and wherein the second delta is calculated based on the sum of the bit-loading capabilities of the second and any remaining streams of the plurality divided by the bit-loading capability of the second stream.

12. The multicarrier transmitter of claim 11 wherein each spatial channel utilizes a same set of OFDM subcarriers.

13. The multicarrier transmitter of claim 12 wherein when the plurality of streams comprises a third stream:

the calculator is configured to calculate a third delta is based on the sum of the bit-loading capabilities of the third and any remaining streams of the plurality divided by the bit-loading capability of the third stream; and the bit extractor is configured to sequentially re-label remaining bits of the input group after extraction of the set of bits for the second stream, and extract a third set of bits for the third stream in a non-sequential manner from the relabeled remaining bits, wherein the bit extractor determines which bits to extract from the relabeled remaining bits for the third stream by multiplying a bit index of each bit of the third set by the third delta to determine a bit index of the bit to extract from the relabeled remaining bits.

* * * * *

UNITED STATES PATENT AND TRADEMARK OFFICE
CERTIFICATE OF CORRECTION

PATENT NO. : 7,644,345 B2  Page 1 of 1
APPLICATION NO. : 11/034204
DATED : January 5, 2010
INVENTOR(S) : Xintian E. Lin et al.

It is certified that error appears in the above-identified patent and that said Letters Patent is hereby corrected as shown below:

On the title page, item (75), in "Inventors", in column 1, line 7, delete "Emeryville" and insert -- San Leandro --, therefor.

Signed and Sealed this

Twenty-third Day of March, 2010

David J. Kappos
*Director of the United States Patent and Trademark Office*